(12) United States Patent
Xu et al.

(10) Patent No.: US 12,705,433 B2
(45) Date of Patent: Aug. 11, 2026

(54) LARGE LANGUAGE MODELS FOR FLOW ARCHITECTURE DESIGN

(71) Applicant: Salesforce, Inc., San Francisco, CA (US)

(72) Inventors: Ran Xu, Palo Alto, CA (US); Zeyuan Chen, Newark, CA (US); Yihao Feng, Palo Alto, CA (US); Krithika Ramakrishnan, New York, NY (US); Congying Xia, Palo Alto, CA (US); Juan Carlos Niebles Duque, Mountain View, CA (US); Vera Serdiukova, Mountain View, CA (US); Huan Wang, Palo Alto, CA (US); Yuxi Zhang, San Francisco, CA (US); Kexin Xie, Foster City, CA (US); Donglin Hu, Dublin, CA (US); Bo Wang, Fremont, CA (US); Ajaay Ravi, Dublin, CA (US); Matthew David Trepina, Indianapolis, IN (US); Sam Bailey, Newtownabbey (GB); Abhishek Das, Bellevue, WA (US); Yuliya Feldman, Palo Alto, CA (US); Pawan Agarwal, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 361 days.

(21) Appl. No.: 18/415,308

(22) Filed: Jan. 17, 2024

(65) Prior Publication Data

US 2025/0086402 A1 Mar. 13, 2025

Related U.S. Application Data

(60) Provisional application No. 63/581,546, filed on Sep. 8, 2023.

(51) Int. Cl.
*G06F 9/50* (2006.01)
*G06F 9/451* (2018.01)
(Continued)

(52) U.S. Cl.
CPC .............. *G06F 40/40* (2020.01); *G06F 9/451* (2018.02); *G06F 9/5033* (2013.01); *G06T 11/00* (2013.01);
(Continued)

(58) Field of Classification Search
CPC ........................ G06F 9/5027; G06F 2209/5017
See application file for complete search history.

(56) References Cited

U.S. PATENT DOCUMENTS 10,691,685 B2 * 6/2020 Verma ............... G06F 16/24522
11,429,433 B2 * 8/2022 Ramamurthy .......... G06F 9/451

OTHER PUBLICATIONS

Turner, et al. "A Genetic Programming Approach to Business Process Mining," GECCO '08: Proceedings of the 10th annual conference on Genetic and evolutionary computation (Jul. 2008). (Year: 2008).*

(Continued)

*Primary Examiner* — Feng-Tzer Tzeng
(74) *Attorney, Agent, or Firm* — Holland & Hart, LLP

(57) ABSTRACT

Methods, systems, apparatuses, devices, and computer program products are described. A flow generation service may receive a natural language input that indicates instructions for automating a task according to a first process flow. Using a large language model (LLM), the flow generation service may decompose the natural language input into a set of elements (e.g., logical actions) and connectors, where the LLM may be trained on first metadata corresponding to a second process flow that is created manually by a user. In addition, using the LLM, the flow generation service may generate second metadata corresponding to each of the set of elements based on decomposing the natural language input.
(Continued)

The flow generation service may sequence and merge the set of elements to generate the first process flow. In some examples, the flow generation service may send, for display to a user interface of a user device, the first process flow.

20 Claims, 10 Drawing Sheets

(51) Int. Cl.
*G06F 40/40* (2020.01)
*G06T 11/00* (2006.01)

(52) U.S. Cl.
CPC .... *G06F 9/5027* (2013.01); *G06F 2209/5017* (2013.01); *G06T 2200/24* (2013.01)

(56) References Cited

OTHER PUBLICATIONS

Beelen, et al. “Metadata Might Make Language Models Better,” arXiv, 2022. (Year: 2022).*

* cited by examiner

600

LARGE LANGUAGE MODELS FOR FLOW ARCHITECTURE DESIGN

CROSS REFERENCES

The present application for patent claims priority to U.S. Provisional Patent Application No. 63/581,546 by Xu et al., entitled "LARGE LANGUAGE MODELS FOR FLOW ARCHITECTURE DESIGN," filed Sep. 8, 2023, which is assigned to the assignee hereof and which is expressly incorporated by reference herein.

FIELD OF TECHNOLOGY

The present disclosure relates generally to database systems and data processing, and more specifically to large language models for flow architecture design.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update automation tools. For example, a flow generation service may be used to design and implement process flows that automate communications or processes for businesses using declarative methods. A user may utilize the flow generation service to use the flow generation service and automate processes using process flows. In some cases, however, building the process flows may require a relatively high level of proficiency in the flow builder service. For example, if flow generation service is unable to understand or process a user's instructions for building a process flow, the flow generation service may generate incorrect or inaccurate process flows (e.g., the automation may not be what the user intended). Thus, current flow builder methods may limit a user's ability to create custom or complex process flows, reduce accuracy of the automation, among other limitations.

DETAILED DESCRIPTION

Figure 1:
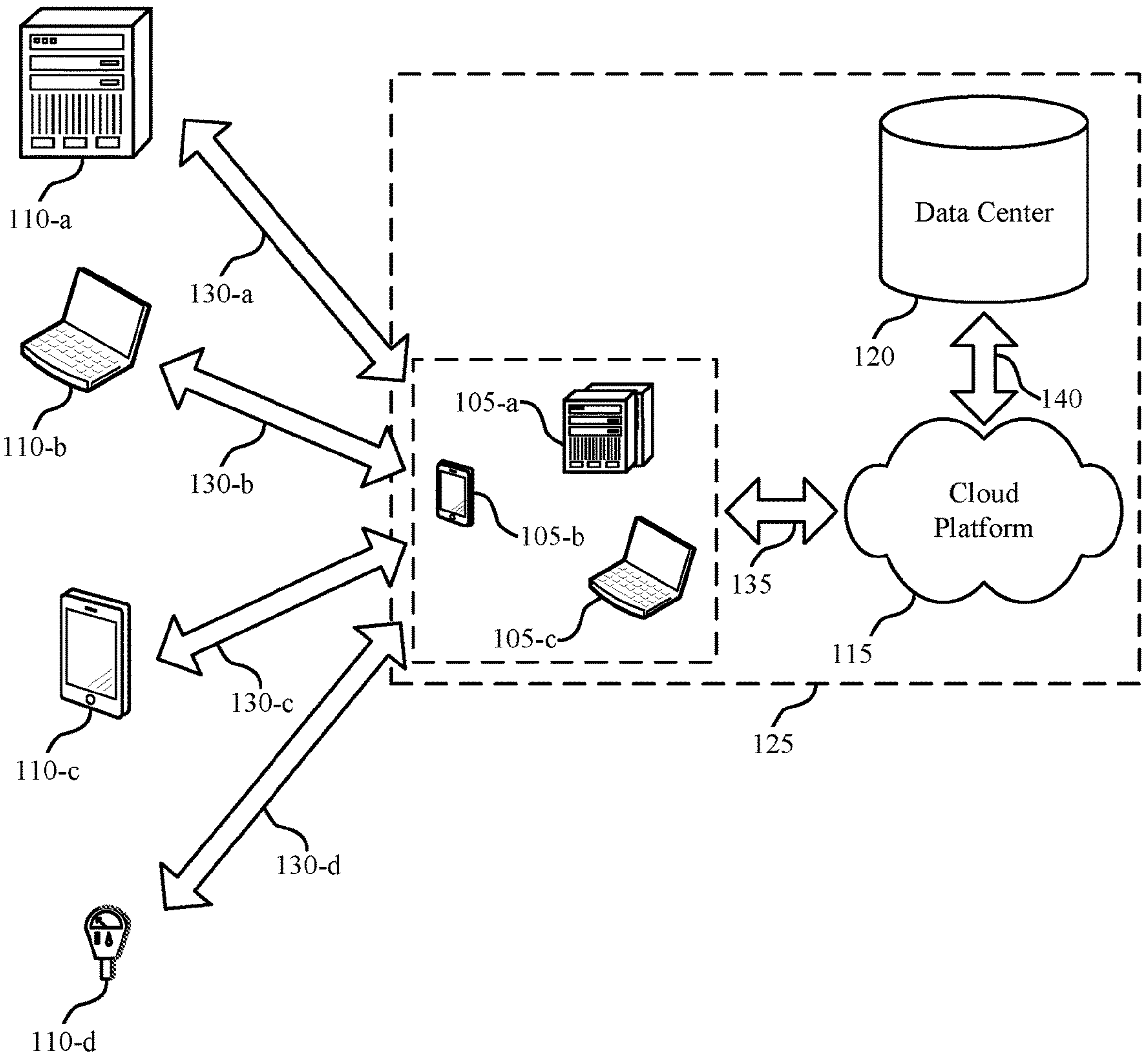
FIG. 1 illustrates an example of a data processing system that supports large language models for flow architecture design in accordance with aspects of the present disclosure.

Some systems may support flow generation services used to design and implement process flows. Such process flows may include no-code automation tools used to automate communications or other processes, such as implementing marketing campaigns, creating, editing, and updating records (e.g., customer records), generating and sending emails, and the like. In addition, a flow generation service may be a declarative tool used to build the process flows using code-like logic and without using a programming language.

A user may design and build a process flow using the flow generation service, which may structure a process flow based on elements, which may perform logical actions, and connectors, which may connect and indicate a relationship between multiple elements. For example, a process flow for a marketing campaign may include elements such as collecting and reading customer behavior data, manipulating the data, generating emails based on the data, and sending the emails to particular customers. In this way, a user may provide instructions to the flow builder service to generate a flow that automates a specific task.

According to one or more aspects of the present disclosure, a user may use the described techniques to generate and edit process flows based on user instructions. For example, given a user instruction describing a task (that is to be automated), a model may generate process flow metadata and deploy the metadata to the flow generation service to generate the process flow. A user may input a natural language input (also referred to herein as a natural language query) to the flow generation service. The natural language input may indicate instructions for automating a task or process in accordance with a first process flow. Using a large language model (LLM) (e.g., a machine learning model, an artificial intelligence (AI) model) to decompose the natural language input into a set of multiple elements and a corresponding set of multiple connectors. For example, an element may include an indication of data (e.g., who sent or received an email), an action (e.g., sending an email), among other information, and a connector may indicate a relationship between two or more elements (e.g., an email will be sent based on the data indicated in the previous element). In addition, the LLM may be trained on first metadata corresponding to a second process flow that was previously created by the user. That is, the user may have used the flow generation service to manually build the second process flow.

Based on decomposing the natural language input, the flow generation service may use the LLM to generate second metadata corresponding to each element of the natural language input. As the LLM model is trained on a user-generated second process flow (and corresponding metadata), and if the first process flow and the second process flow are associated with a similar task, the flow generation service may use the LLM to effectively compare the first and second process flows to generate the second metadata. As such, the LLM may effectively use the first metadata to fine-tune its understanding of the natural language input. The flow generation service may sequence and merge (e.g., combine) the set of multiple elements to generate the first process flow in accordance with the second metadata (and thus, as the user intended). In some examples, the flow generation service may send, for display to a user interface of a user device, the first process flow.

The techniques described herein for generating and editing process flows based on user instructions may result in one of the following potential improvements. In some examples, the described techniques may leverage an LLM in order generate a process flow based on a natural language input, which may improve flow-generation efficiency as the process flows may be generated more quickly than when the flow generation service relies on user instructions alone. In addition, the techniques described herein may simplify the flow-building experience by enabling interactions between the flow generation service and the LLM, thus making the flow generation service more accessible to non-technical users. This may encourage novice users to generate more complicated, efficient process flows. In some examples, the LLM may enable generative AI-enabled flow creation, which may reduce error rates that may be associated with manually generating process flows.

Aspects of the disclosure are initially described in the context of an environment supporting an on-demand database service. Aspects of the disclosure are then described in the context of conversational flow generation models, system architectures, and process flows. Aspects of the disclosure are further illustrated by and described with reference to apparatus diagrams, system diagrams, and flowcharts that relate to large language models for flow architecture design.

FIG. 1 illustrates an example of a system 100 for cloud computing that supports large language models for flow architecture design in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

A device (e.g., any component of subsystem 125, such as a cloud client 105, a server or server cluster associated with the cloud platform 115 or data center 120, etc.) may support flow generation services used to design and implement process flows. Such process flows may include no-code automation tools used to automate communications or other processes, such as implementing marketing campaigns, creating, editing, and updating records (e.g., customer records), generating and sending emails, and the like. In addition, a flow generation service may be a declarative tool used to build the process flows using code-like logic and without using a programming language. The flow generation service may build or generate a process flow based on elements, which may represent logical actions, and connectors, which may connect and indicate a relationship between multiple elements. For example, a process flow for a marketing campaign may include elements such as collecting and reading customer behavior data, manipulating the data, generating emails based on the data, and sending the emails to particular customers. In this way, a user may provide instructions to the flow builder service to generate a flow that automates a specific task.

However, building some process flows using conventional methods may require a relatively high level of proficiency in the flow builder service. For example, if flow generation service is unable to understand or process a user's instructions for building a process flow, the flow generation service may generate incorrect or inaccurate process flows (e.g., the automation may not be what the user intended). Thus, current flow builder methods may limit a user's ability to create custom or complex process flows, reduce accuracy of the automation, among other limitations.

The system 100 may support the generation and editing of process flows based on user instructions. For example, given a user instruction describing a task (that is to be automated), a model may generate process flow metadata and deploy the metadata to the flow generation service to generate the process flow. A user may input a natural language input (also referred to herein as a natural language query) to the flow generation service. The natural language input may indicate instructions for automating a task or process in accordance with a first process flow. Using a large language model (LLM) (e.g., a machine learning model, an artificial intelligence (AI) model) to decompose the natural language input into a set of multiple elements and a corresponding set of multiple connectors. For example, an element may include an indication of data (e.g., who sent or received an email), an action (e.g., sending an email), among other information, and a connector may indicate a relationship between two or more elements (e.g., an email will be sent based on the data indicated in the previous element). In addition, the LLM may be trained on first metadata corresponding to a second process flow that was previously created by the user. That is, the user may have used the flow generation service to manually build the second process flow.

Based on decomposing the natural language input, the flow generation service may use the LLM to generate second metadata corresponding to each element of the natural language input. As the LLM model is trained on a user-generated second process flow (and corresponding metadata), and if the first process flow and the second process flow are associated with a similar task, the flow generation service may use the LLM to effectively compare the first and second process flows to generate the second metadata. As such, the LLM may effectively use the first metadata to fine-tune its understanding of the natural language input. The flow generation service may sequence and merge (e.g., combine) the set of multiple elements to generate the first process flow in accordance with the second metadata (and thus, as the user intended). In some examples, the flow generation service may send, for display to a user interface of a user device, the first process flow.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein.

However, the description and appended drawings only include example technical improvements resulting from implementing aspects of the disclosure, and accordingly do not represent all of the technical improvements provided within the scope of the claims.

Figure 2:
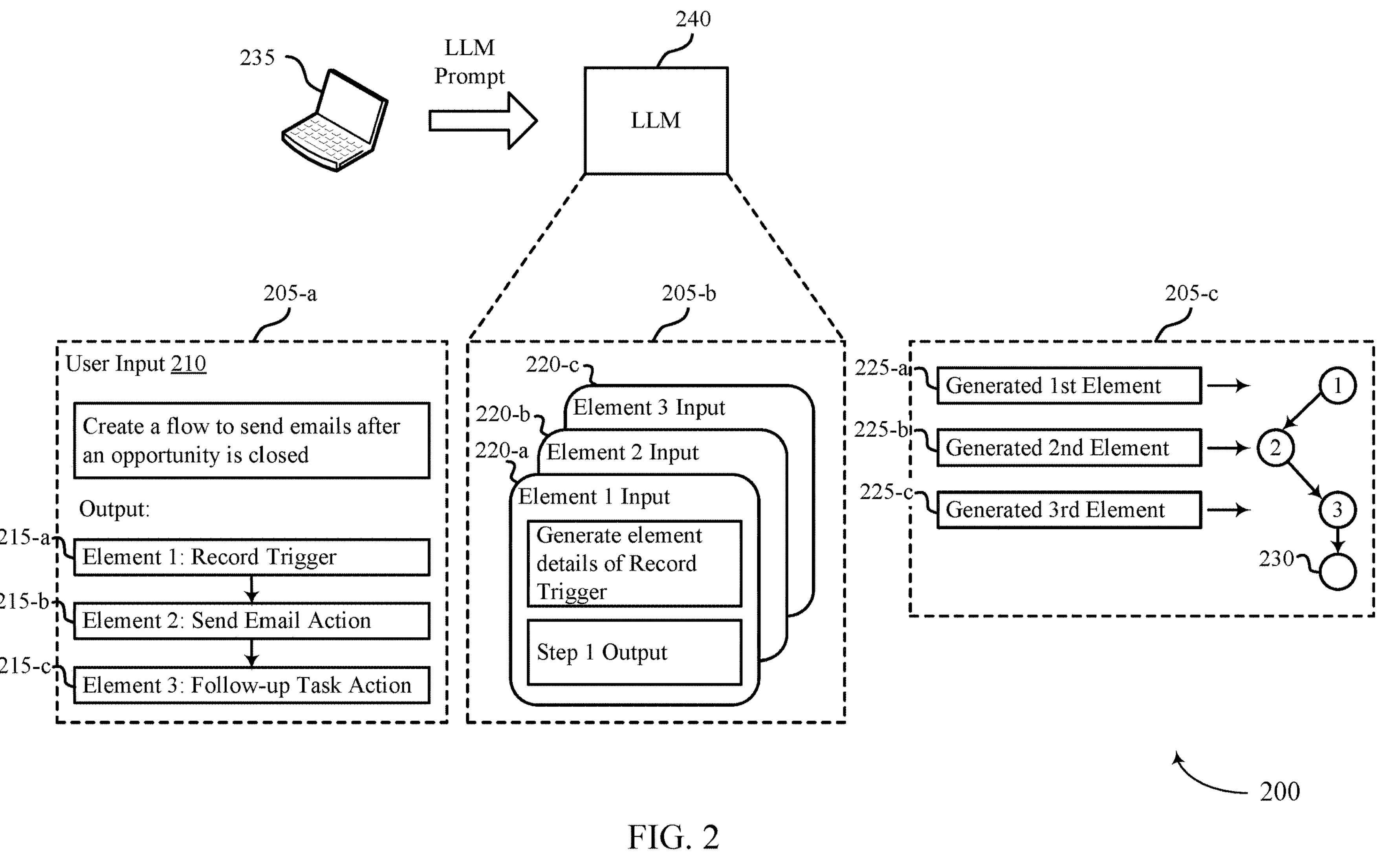
FIG. 2 shows an example of a conversational flow generation model that supports large language models for flow architecture design in accordance with aspects of the present disclosure.

FIG. 2 shows an example of a conversational flow generation model 200 that supports large language models for flow architecture design in accordance with aspects of the present disclosure. The conversational flow generation model 200 may be supported by an application server or another system which may be an example of a corresponding device described herein with reference to FIG. 1. In some cases, the functions performed by the application server may instead be performed by another component of the cloud platform 115. In some examples, the application server may support communication with an external server. The conversational flow generation model 200 may be used to create flow metadata, given a user instruction describing a task to be automated, for generating a process flow.

The conversational flow generation model 200 may support interactions between a flow generation service (also referred to herein as a flow builder) and an LLM 240 to enable the flow generation service to generate and edit process flows based on user instructions. That is, the conversational flow generation model 200 may support techniques for using an LLM 240 to generate a process flow based on a natural language input.

During a first flow generation stage 205-*a*, a user (e.g., a flow user) may input a user input 210 into a flow generation service via a user device 235. The user input 210 may include a natural language input or prompt indicating instructions for automating a task or process according to a first process flow. For example, if the task is to send an email based on a particular trigger, the user may input "create a flow to send emails after an opportunity is closed, then follow-up with the customer." The flow generation service may decompose the user input 210 into a set of elements 215 that represent actions associated with the task. For example, an element 215-*a* (e.g., element 1) may indicate a record trigger, an element 215-*b* (e.g., element 2) may indicate to send an email action, and an element 215-*c* (e.g., element 3) may indicate a follow-up task action.

During a second flow generation stage 205-*b*, the flow generation service may utilize the LLM 240 to generate detailed content associated with the elements and resources associated with the process flow (e.g., flow element details). For example, based on the LLM prompt that is input to the LLM 240, which may include the elements of the user input 210, the LLM 240 may generate element details 220. The element details 220 may include element details 220-*a* (e.g., an element 1 input and a corresponding output), element details 220-*b* (e.g., an element 2 input and a corresponding output), and element details 220-*c* (e.g., an element 3 input and a corresponding output). For example, the element details 220-*a* may correspond to the element 215-*a*, and thus may include element details of the record trigger. The element details 220 may each indicate the specific flow element details that are output based on the respective input. As such, the element details 220 may be element metadata associated with each element of the user input 210.

During a third flow generation stage 205-*c*, the flow generation service may merge the generated flow elements (e.g., and topology) to produce the full process flow. For example, the flow generation service may sequence and merge a generated element 225-*a* (e.g., a generated 1st element), a generated element 225-*b* (e.g., a generated 2nd element), and a generated element 225-*c* (e.g., a generated 3rd element). These three generated elements 225 (and any other generated elements corresponding to the user input 210) may be combined to create a flow object 230 corresponding to the process flow.

Figure 3:
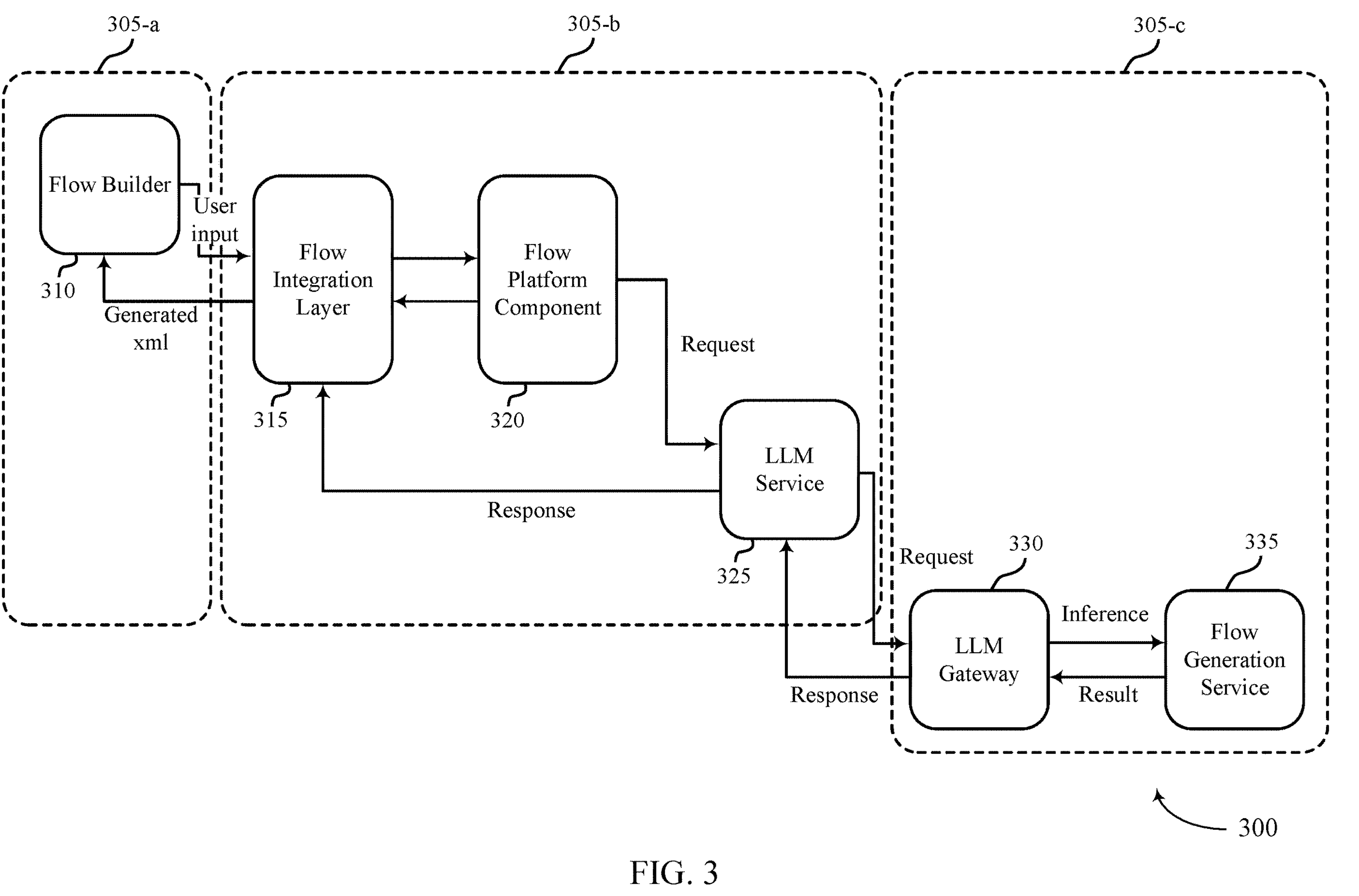
FIG. 3 shows an example of a system architecture that supports large language models for flow architecture design in accordance with aspects of the present disclosure.

FIG. 3 shows an example of a system architecture 300 that supports large language models for flow architecture design in accordance with aspects of the present disclosure. The system architecture 300 may implement or be implemented by aspects of the system 100 and the conversational flow generation model 200. For example, the system architecture 300 may support the creation of flow metadata, given a user instruction describing a task to be automated, for generating a process flow. The system architecture 300 may include functional domains 305, which may support or host different aspects of the conversational flow generation model 200 described herein with reference to FIG. 2.

The system architecture 300 may support interactions between a flow builder 310, which may be hosted in a functional domain 305-*a*, and an LLM, which may be hosted in a flow generation service 335 of a functional domain 305-*c*. Such interactions may enable the flow generation service 335 to generate and edit process flows based on user instructions. That is, the system architecture 300 may support techniques for using an LLM to generate a process flow based on a natural language input. To enable the LLM to understand a natural language input from a user and use it to generate process flow metadata, the LLM may be iteratively trained (e.g., fine-tuned) based on a process flow that was manually built by a user.

A natural language input (also referred to herein as a natural language prompt, a user prompt, a user input) from a user (via a user device) may be input to a flow integration layer 315 hosted in a functional domain 305-*b*. The natural language input may be a description, in laymen language, of what task or process the user wishes to automate and how they wish to automate it. For example, the process flow may include a sequence of elements or actions that indicate a process for automating the task. The flow integration layer 315 may forward the natural language input to a flow platform component 320, and the flow platform component 320 may transmit a request to an LLM service 325 to decompose the natural language input into elements and connectors (e.g., automation steps). The LLM service 325 may use the topology, the resource list, and the flow properties to extract a list of prompts for each element and prompts for each resource.

In decomposing the natural language input, the LLM service 325 may generate (e.g., using a generator component) high-level representations of a topology (e.g., elements and connectors), a resource list, and properties of a corresponding process flow. The topology may represent the structure of the flow as a graph and may include elements, which may be represented as nodes in the graph, and connectors, which may be represented as edges in the graph. At this stage, only a high-level representation of each element may be generated. In addition, the resource list may indicate a list of the high-level representations of the resources, and the flow properties may include one or more global properties of the entire flow, such as a description, a label, and the like.

In some examples, for each task, a prompt may be sent to a prompt generator model along with some examples received from a local cache. The engineered prompt may be sent to the LLM service 325 to generate corresponding data, and a post processing step may be applied to perform a check of each generated part and correct any errors. In some examples, the prompt generator may use the topology and the resource list to systematically generate prompts for elements and resources that may be used to generate a process flow. The prompt generator may group the generated prompts together and transmit them to the generator in batch form, such that an inference may be run in parallel and thus, may be highly efficient. That is, for each prompt for an element or a resource that is received as an input, metadata for the element or the resource may be output, where the output may include detailed parameters corresponding to the specific element or resource. The LLM service 325 may parse and validate each generated metadata for an element or a resource. In some aspects, the LLM service 325 may support a collector component that may collect the metadata for the elements and resources and transmit them to a composer component. The composer may use the generated metadata to construct the metadata for the process flow.

In addition, the LLM service 325 may use a decomposer component to decompose the process flow to an intermediate representation. For example, a decomposer may decompose the flow xml to a topology, element and resource metadata, and the flow properties. The data may then be used to train the generator, and some data may also be used as examples in the local cache.

The LLM service 325 may transmit a sequential request to the flow generation service 335 via an LLM gateway 330 to generate detailed metadata associated with the elements and the resources. The LLM gateway 330 and the flow generation service 335 may be hosted in the functional domain 305-*c*. In some examples, the LLM gateway 330 may transmit the inference to the flow generation service 335. The flow generation service 335 may sequence and merge the detailed metadata associated with the elements and the resources to generate the process flow. In some cases, the flow generation service 335 may support a composer that constructs process flow metadata (e.g., in .xml format) using the topology, the element and resource metadata, and the flow properties. In some examples, the flow generation service 335 may send, for display to a user interface via a user device, the first process flow (e.g., such that a user may view and implement the process flow). In some examples, the flow generation service 335 may transmit a response to the flow integration layer 315 via the LLM gateway 330, the LLM service 325, and the flow platform component 320, and the flow integration layer 315 may transmit the generated .xml corresponding to the generated process flow to the flow builder 310. The flow builder 310 may display the process flow (e.g., the generated .xml) via a user interface.

In some examples, the generated process flows may include custom objects, fields, and/or invocable actions that may be specific to an organization and vary across different organizations. In addition, the generated process flows may manage the permissions of standard objects. The generated process flows may also ensure there is no data leakage, meaning that the LLM may refrain from inadvertently generating any custom objects or fields that are not associated with the intended organization. For example, a user may be part of a company that produces jet engines, and thus, they may generate a process flow that includes specific fields corresponding to different varieties of jet engines. The user may generate a process flow that notifies a manager when a sales representative reaches a sales quota for a specific type of jet engine. In some other examples, a user may be a part of a company that makes candy, and thus, the user may generate process flows that include fields corresponding to different types of candy. An example of such a process flow may notify a party when some quantity of candy bars are produced at a particular facility. In each of these cases, the flow generation service may include custom fields or objects based on the user's specific use case, and may lack fields or objects unrelated to the user or the user's business. For example, a process flow related to jet engines may lack any fields associated with candy, and a process flow related to the candy company may lack any fields associated with jet engines.

In evaluating the performance of the LLM model, a user may consider whether a generated process flow is relevant to the task or process being automated (e.g., aligned with the user's intent). To evaluate the relevance of the process flow, the user may utilize a relevance score that is based on correct generation of the topology of the process flow (e.g., the high-level graph of the elements and connectors of the process flow) and correct generation of the flow properties. Such relevance scores may be generated for process flows in real time and offline, such that a user may expect how the model may perform in real use cases. In addition, such relevance scores may be based on a comparison between a manually-generated process flow and an LLM-generated process flow having similar attributes.

For example, in determining a relevance score, the user may compare the topology of the LLM-generated process flow with a similar user-generated process flow (e.g., a ground model). If the LLM-generated process flow differs substantially from the user-generated process flow, the user may edit the topology (e.g., add or remove nodes, etc.) until the topology represents a more accurate or more desired process flow. The more effort that is put into editing the topology, the lower the relevance score, which may indicate that the LLM 240 requires further training or fine-tuning.

Regarding the flow properties, there may be many different fields associated with a particular action or element of the process flow. For example, a node corresponding to sending an email may include many different fields (e.g., representing a header or subject line, the body of the email, the sender and recipients, etc.), some of which may be generated incorrectly. The user may manually update the fields, and similarly, the more effort that is involved in editing the fields or flow properties may decrease the relevance score. As some fields may be more important than others to the execution or accuracy of the process flow, the user may weigh each field or flow property when determining relevance.

Figure 4:
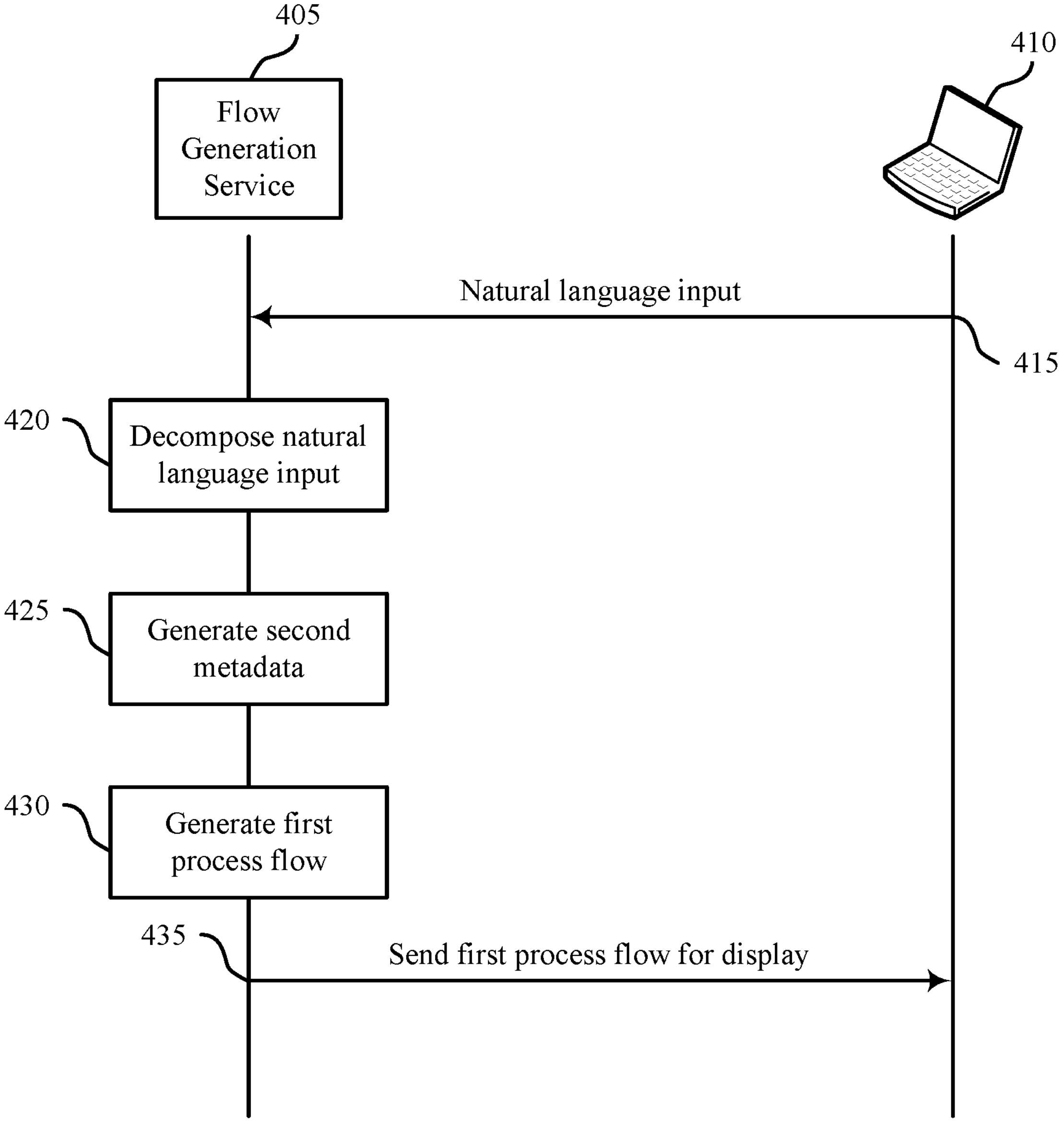
FIG. 4 shows an example of a process flow that supports large language models for flow architecture design in accordance with aspects of the present disclosure.

FIG. 4 shows an example of a process flow 400 that supports large language models for flow architecture design in accordance with aspects of the present disclosure. The process flow 400 may implement or be implemented by aspects of the system 100, the conversational flow generation model 200, or the system architecture 300. For example, the process flow 400 may include a flow generation service 405 and a user device 410, which may be examples of corresponding services and platforms described herein. In the following description of the process flow 400, operations between the flow generation service 405 and the user device 410 be performed in a different order or at a different time than as shown. Additionally, or alternatively, some operations may be omitted from the process flow 400, and other operations may be added to the process flow 400.

At 415, the flow generation service 405 may receive, via a user input, a natural language input that indicates instructions for automating a task in accordance with a first process flow. The natural language input (also referred to herein as a user input, a user prompt, or a natural language prompt) may include a set of elements and a set of connectors that define a process for automating the task. An element may include a logical action (e.g., an email send, data collecting, etc.) and a connector may indicate a relationship or link between two or more elements (e.g., a connector may indicate that an email is to be sent to recipients based on data associated with those recipients).

At 420, the flow generation service 405 decompose, using an LLM, the natural language input into a set of multiple elements and a set of multiple connectors, where the LLM may be trained on first metadata corresponding to a second process flow that is created by a user. That is, the LLM may be trained or fine-tuned based on a previous process flow that was manually created by the user. In some examples, the decomposition may include generating a topology or a graph of the natural language input.

At 425, the flow generation service 405 may generate, using the LLM, second metadata corresponding to each element of the set of multiple elements of the natural language input based on decomposing the natural language input. The second metadata may allow the user's instructions to be used to generate an accurate process flow.

At 430, the flow generation service 405 may generate the first process flow based on combining the set of multiple elements in accordance with the second metadata. That is, the flow generation service 405 may sequence and merge the elements to create the process flow, which may satisfy the user's initial instructions.

At 435, the flow generation service 405 may send, for display to a user interface of the user device 410, the first process flow including the combined set of multiple elements. In some examples, the first process flow may be displayed for utilization or other implementation by the user.

Figure 5:
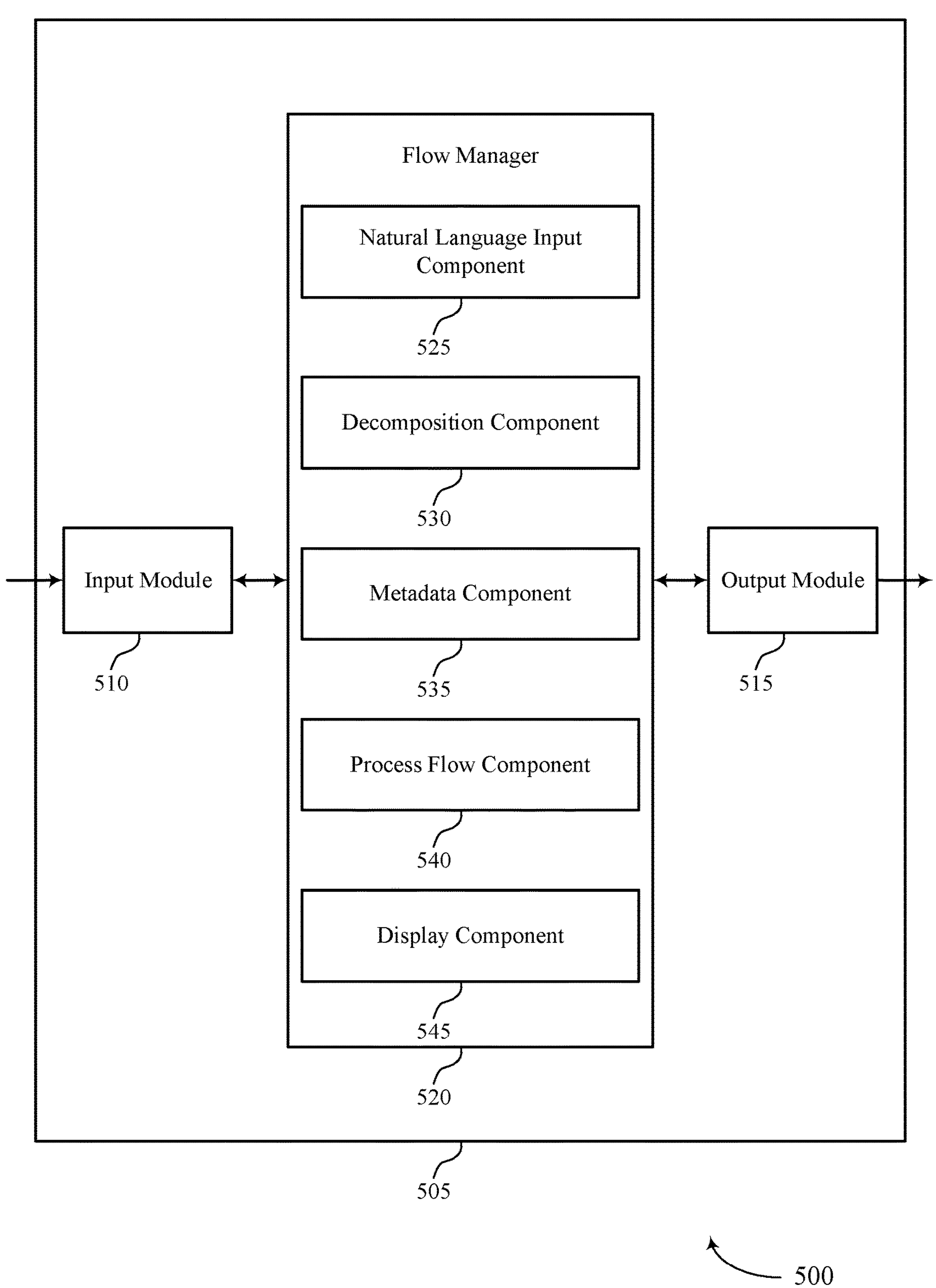
FIG. 5 shows a block diagram of an apparatus that supports large language models for flow architecture design in accordance with aspects of the present disclosure.

FIG. 5 shows a block diagram 500 of a device 505 that supports large language models for flow architecture design in accordance with aspects of the present disclosure. The device 505 may include an input module 510, an output module 515, and a flow manager 520. The device 505, or one or more components of the device 505 (e.g., the input module 510, the output module 515, and the flow manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the flow manager 520 to support large language models for flow architecture design. In some cases, the input module 510 may be a component of an input/output (I/O) controller 710 as described with reference to FIG. 7.

The output module 515 may manage output signals for the device 505. For example, the output module 515 may receive signals from other components of the device 505, such as the flow manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the flow manager 520 may include a natural language input component 525, a decomposition component 530, a metadata component 535, a process flow component 540, a display component 545, or any combination thereof. In some examples, the flow manager 520, or various components thereof, may be configured to perform various operations (e.g., receiving, monitoring, transmitting) using or otherwise in cooperation with the input module 510, the output module 515, or both. For example, the flow manager 520 may receive information from the input module 510, send information to the output module 515, or be integrated in combination with the input module 510, the output module 515, or both to receive information, transmit information, or perform various other operations as described herein.

The flow manager 520 may support data processing in accordance with examples as disclosed herein. The natural language input component 525 may be configured to support receiving, via user input, a natural language input that indicates instructions for automating a task in accordance with a first process flow. The decomposition component 530 may be configured to support decomposing, using a large language model, the natural language input into a set of multiple elements and a set of multiple connectors, where the large language model is trained on first metadata corresponding to a second process flow that is created by a user. The metadata component 535 may be configured to support generating, using the large language model, second metadata corresponding to each element of the set of multiple elements of the natural language input based on decomposing the natural language input. The process flow component 540 may be configured to support generating the first process flow based on combining the set of multiple elements in accordance with the second metadata. The display component 545 may be configured to support sending, for display to a user interface of a user device, the first process flow including the combined set of multiple elements.

Figure 6:
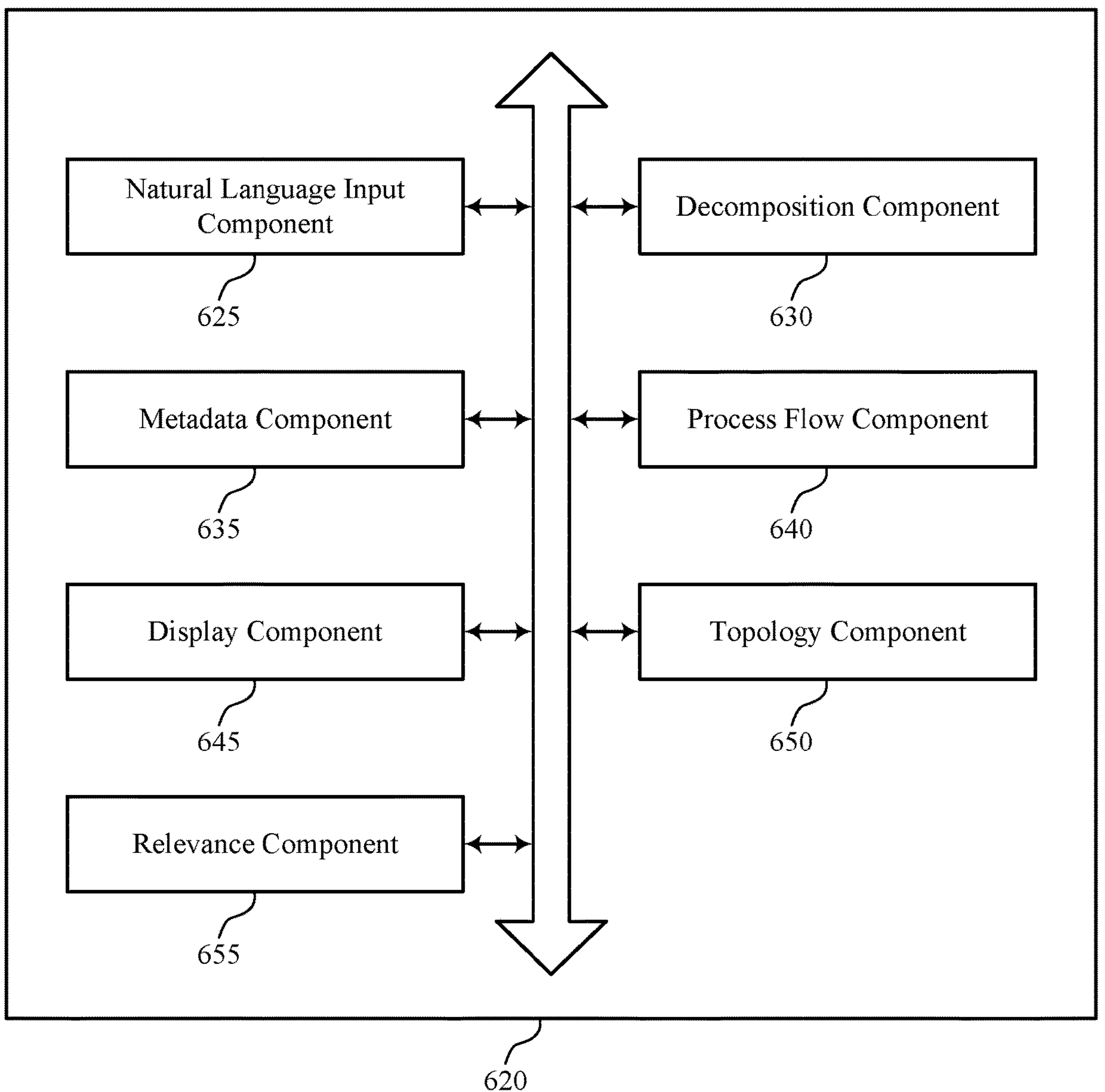
FIG. 6 shows a block diagram of a flow manager that supports large language models for flow architecture design in accordance with aspects of the present disclosure.

FIG. 6 shows a block diagram 600 of a flow manager 620 that supports large language models for flow architecture design in accordance with aspects of the present disclosure. The flow manager 620 may be an example of aspects of a flow manager or a flow manager 520, or both, as described herein. The flow manager 620, or various components thereof, may be an example of means for performing various aspects of large language models for flow architecture design as described herein. For example, the flow manager 620 may include a natural language input component 625, a decomposition component 630, a metadata component 635, a process flow component 640, a display component 645, a topology component 650, a relevance component 655, or any combination thereof. Each of these components, or components of subcomponents thereof (e.g., one or more processors, one or more memories), may communicate, directly or indirectly, with one another (e.g., via one or more buses).

The flow manager 620 may support data processing in accordance with examples as disclosed herein. The natural language input component 625 may be configured to support receiving, via user input, a natural language input that indicates instructions for automating a task in accordance with a first process flow. The decomposition component 630 may be configured to support decomposing, using a large language model, the natural language input into a set of multiple elements and a set of multiple connectors, where the large language model is trained on first metadata corresponding to a second process flow that is created by a user. The metadata component 635 may be configured to support generating, using the large language model, second metadata corresponding to each element of the set of multiple elements of the natural language input based on decomposing the natural language input. The process flow component 640 may be configured to support generating the first process flow based on combining the set of multiple elements in accordance with the second metadata. The display component 645 may be configured to support sending, for display to a user interface of a user device, the first process flow including the combined set of multiple elements.

In some examples, to support decomposing the natural language input, the topology component 650 may be configured to support generating a topology of the natural language input, where the topology includes a graphical representation of the set of multiple elements and the set of multiple connectors.

In some examples, to support decomposing the natural language input, the decomposition component 630 may be configured to support generating a resource list and a set of properties associated with the natural language input.

In some examples, to support generating the second metadata, the metadata component 635 may be configured to support comparing each element of the set of multiple elements of the natural language input to the first metadata corresponding to the second process flow that is created by the user, where the second metadata is based on the comparison.

In some examples, the relevance component 655 may be configured to support determining a relevance score associated with the first process flow based on the decomposition of the natural language input, where the relevance score indicates how relevant each element of the set of multiple elements is to the task.

In some examples, the first process flow includes one or more custom objects associated with the task. In some examples, the second metadata includes a set of element details corresponding to each element of the set of multiple elements.

In some examples, each element of the set of multiple elements includes an action associated with the task and each connector of the set of multiple connectors indicates a relationship between two or more elements of the set of multiple elements.

Figure 7:
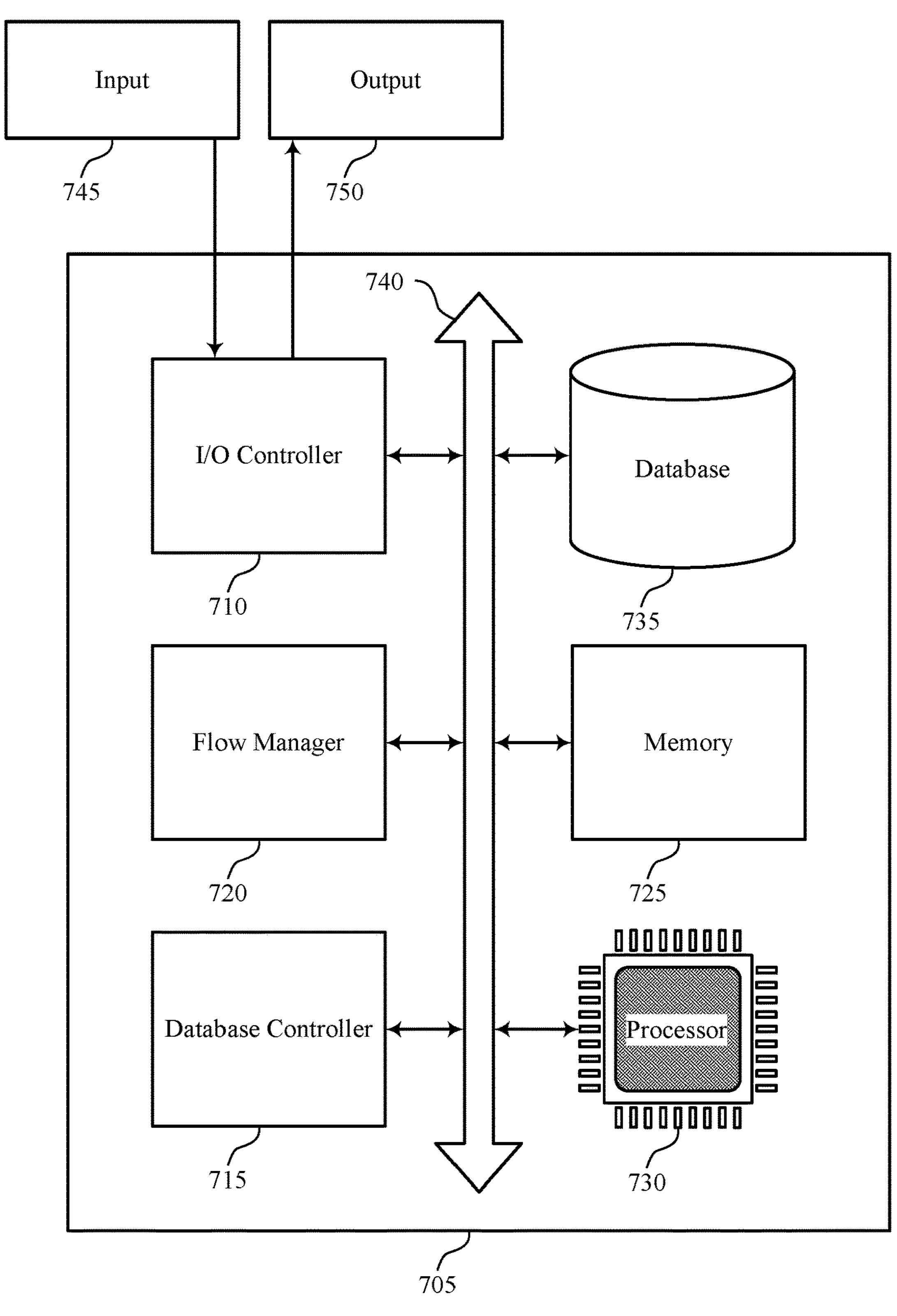
FIG. 7 shows a diagram of a system including a device that supports large language models for flow architecture design in accordance with aspects of the present disclosure.

FIG. 7 shows a diagram of a system 700 including a device 705 that supports large language models for flow architecture design in accordance with aspects of the present disclosure. The device 705 may be an example of or include the components of a device 505 as described herein. The device 705 may include components for bi-directional data communications including components for transmitting and receiving communications, such as a flow manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting large language models for flow architecture design). The processor 730 may be an example of a single processor or multiple processors. For example, the device 705 may include one or more processors 730.

The flow manager 720 may support data processing in accordance with examples as disclosed herein. For example, the flow manager 720 may be configured to support receiving, via user input, a natural language input that indicates instructions for automating a task in accordance with a first process flow. The flow manager 720 may be configured to support decomposing, using a large language model, the natural language input into a set of multiple elements and a set of multiple connectors, where the large language model is trained on first metadata corresponding to a second process flow that is created by a user. The flow manager 720 may be configured to support generating, using the large language model, second metadata corresponding to each element of the set of multiple elements of the natural language input based on decomposing the natural language input. The flow manager 720 may be configured to support generating the first process flow based on combining the set of multiple elements in accordance with the second metadata. The flow manager 720 may be configured to support sending, for display to a user interface of a user device, the first process flow including the combined set of multiple elements.

By including or configuring the flow manager 720 in accordance with examples as described herein, the device 705 may support techniques for generating process flows using an LLM based on user instructions, which may increase efficiency, reduce error rates, improve user experience, decrease complexity, and improve accessibility.

Figure 8:
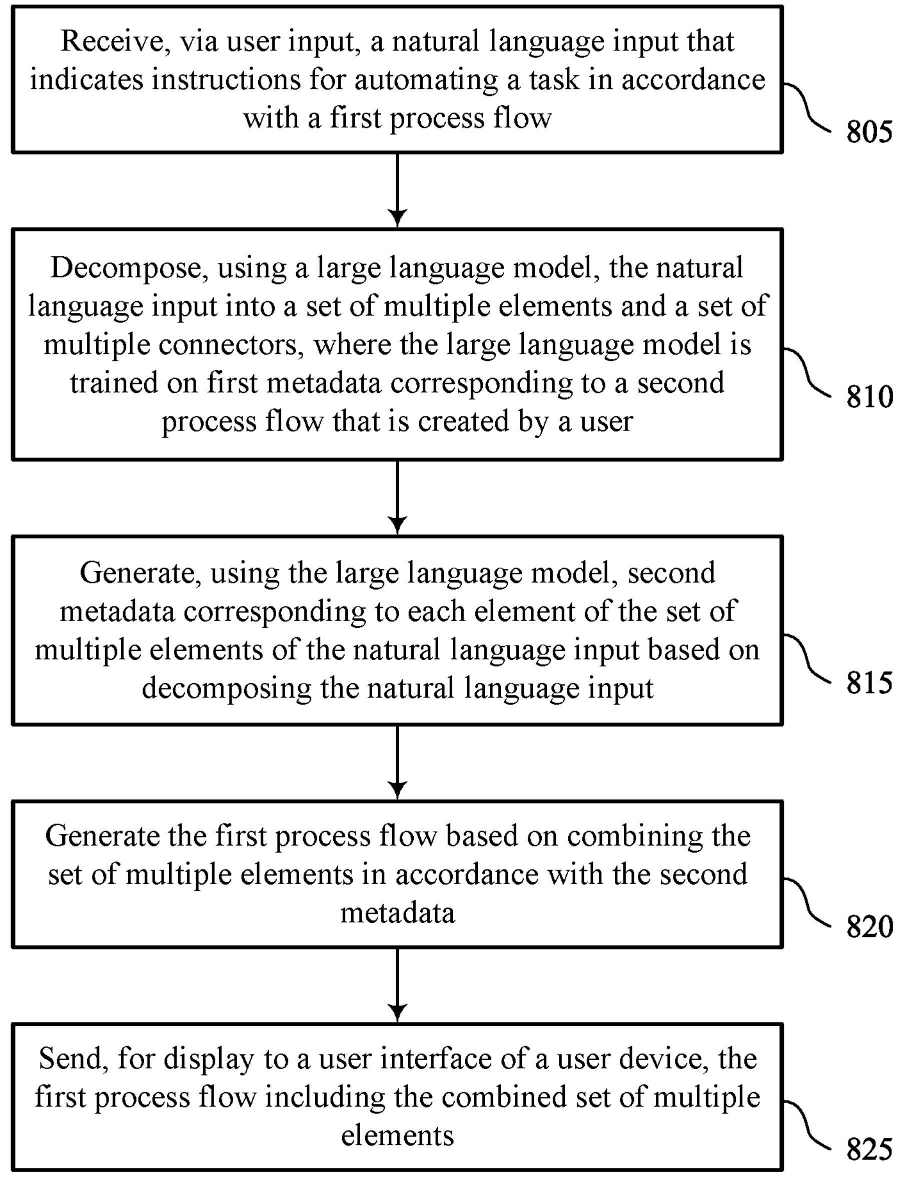
FIGS. 8 through 10 show flowcharts illustrating methods that support large language models for flow architecture design in accordance with aspects of the present disclosure.

FIG. 8 shows a flowchart illustrating a method 800 that supports large language models for flow architecture design in accordance with aspects of the present disclosure. The operations of the method 800 may be implemented by a flow manager or its components as described herein. For example, the operations of the method 800 may be performed by a flow manager as described with reference to FIGS. 1 through 7. In some examples, a flow manager may execute a set of instructions to control the functional elements of the flow manager to perform the described functions. Additionally, or alternatively, the flow manager may perform aspects of the described functions using special-purpose hardware.

At 805, the method may include receiving, via user input, a natural language input that indicates instructions for automating a task in accordance with a first process flow. The operations of 805 may be performed in accordance with examples as disclosed herein. In some examples, aspects of the operations of 805 may be performed by a natural language input component 625 as described with reference to FIG. 6.

At 810, the method may include decomposing, using a large language model, the natural language input into a set of multiple elements and a set of multiple connectors, where the large language model is trained on first metadata corresponding to the second process flow that is created by a user. The operations of 810 may be performed in accordance with examples as disclosed herein. In some examples, aspects of the operations of 810 may be performed by a decomposition component 630 as described with reference to FIG. 6.

At 815, the method may include generating, using the large language model, second metadata corresponding to each element of the set of multiple elements of the natural language input based on decomposing the natural language input. The operations of 815 may be performed in accordance with examples as disclosed herein. In some examples, aspects of the operations of 815 may be performed by a metadata component 635 as described with reference to FIG. 6.

At 820, the method may include generating the first process flow based on combining the set of multiple elements in accordance with the second metadata. The operations of 820 may be performed in accordance with examples as disclosed herein. In some examples, aspects of the operations of 820 may be performed by a process flow component 640 as described with reference to FIG. 6.

At 825, the method may include sending, for display to a user interface of a user device, the first process flow including the combined set of multiple elements. The operations of 825 may be performed in accordance with examples as disclosed herein. In some examples, aspects of the operations of 825 may be performed by a display component 645 as described with reference to FIG. 6.

Figure 9:
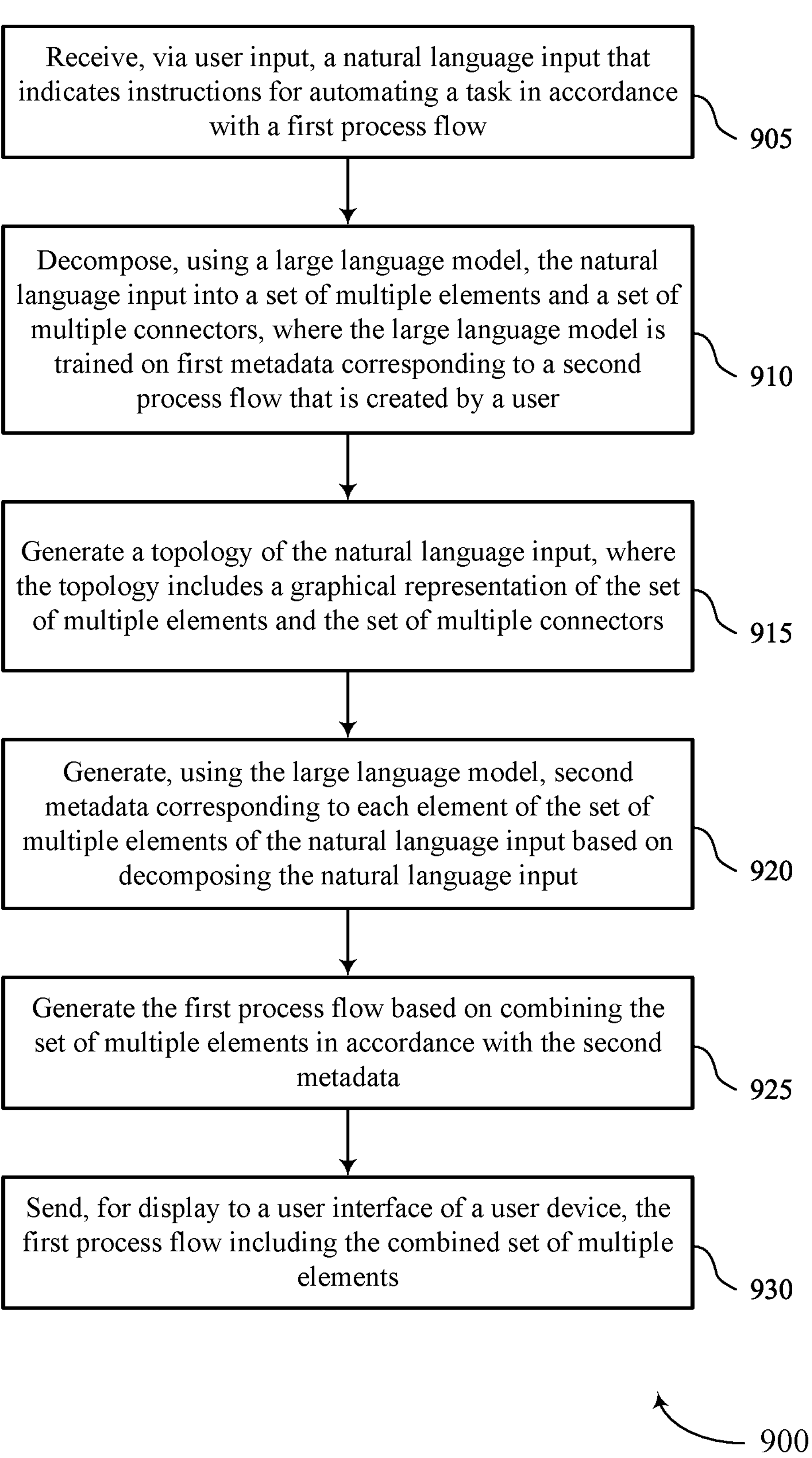

FIG. 9 shows a flowchart illustrating a method 900 that supports large language models for flow architecture design in accordance with aspects of the present disclosure. The operations of the method 900 may be implemented by a flow manager or its components as described herein. For example, the operations of the method 900 may be performed by a flow manager as described with reference to FIGS. 1 through 7. In some examples, a flow manager may execute a set of instructions to control the functional elements of the flow manager to perform the described functions. Additionally, or alternatively, the flow manager may perform aspects of the described functions using special-purpose hardware.

At 905, the method may include receiving, via user input, a natural language input that indicates instructions for automating a task in accordance with a first process flow. The operations of 905 may be performed in accordance with examples as disclosed herein. In some examples, aspects of the operations of 905 may be performed by a natural language input component 625 as described with reference to FIG. 6.

At 910, the method may include decomposing, using a large language model, the natural language input into a set of multiple elements and a set of multiple connectors, where the large language model is trained on first metadata corresponding to the second process flow that is created by a user. The operations of 910 may be performed in accordance with examples as disclosed herein. In some examples, aspects of the operations of 910 may be performed by a decomposition component 630 as described with reference to FIG. 6.

At 915, the method may include generating a topology of the natural language input, where the topology includes a graphical representation of the set of multiple elements and the set of multiple connectors. The operations of 915 may be performed in accordance with examples as disclosed herein. In some examples, aspects of the operations of 915 may be performed by a topology component 650 as described with reference to FIG. 6.

At 920, the method may include generating, using the large language model, second metadata corresponding to each element of the set of multiple elements of the natural language input based on decomposing the natural language input. The operations of 920 may be performed in accordance with examples as disclosed herein. In some examples, aspects of the operations of 920 may be performed by a metadata component 635 as described with reference to FIG. 6.

At 925, the method may include generating the first process flow based on combining the set of multiple elements in accordance with the second metadata. The operations of 925 may be performed in accordance with examples as disclosed herein. In some examples, aspects of the operations of 925 may be performed by a process flow component 640 as described with reference to FIG. 6.

At 930, the method may include sending, for display to a user interface of a user device, the first process flow including the combined set of multiple elements. The operations of 930 may be performed in accordance with examples as disclosed herein. In some examples, aspects of the operations of 930 may be performed by a display component 645 as described with reference to FIG. 6.

Figure 10:
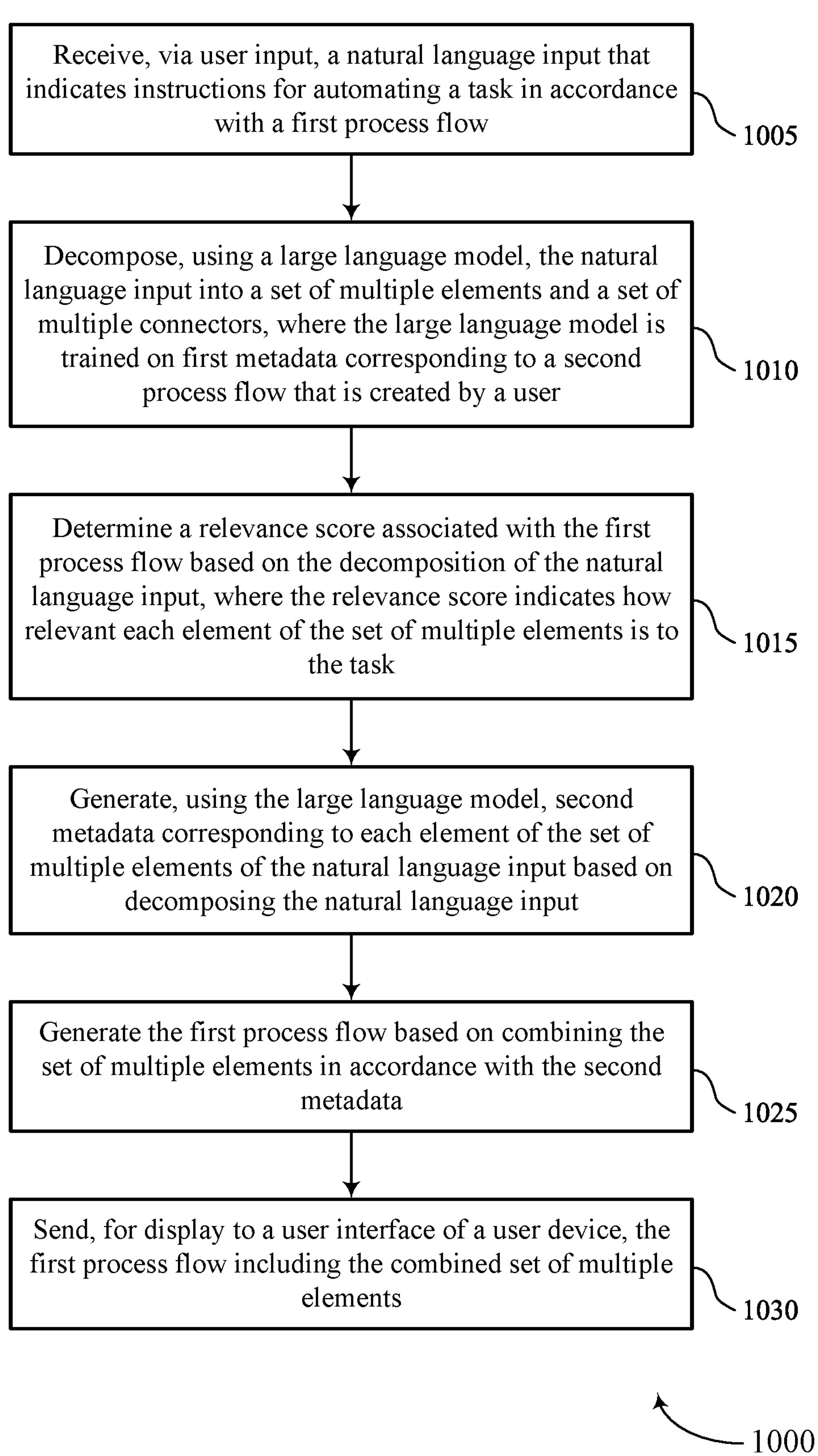

FIG. 10 shows a flowchart illustrating a method 1000 that supports large language models for flow architecture design in accordance with aspects of the present disclosure. The operations of the method 1000 may be implemented by a flow manager or its components as described herein. For example, the operations of the method 1000 may be performed by a flow manager as described with reference to FIGS. 1 through 7. In some examples, a flow manager may execute a set of instructions to control the functional elements of the flow manager to perform the described functions. Additionally, or alternatively, the flow manager may perform aspects of the described functions using special-purpose hardware.

At 1005, the method may include receiving, via user input, a natural language input that indicates instructions for automating a task in accordance with a first process flow. The operations of 1005 may be performed in accordance with examples as disclosed herein. In some examples, aspects of the operations of 1005 may be performed by a natural language input component 625 as described with reference to FIG. 6.

At 1010, the method may include decomposing, using a large language model, the natural language input into a set of multiple elements and a set of multiple connectors, where the large language model is trained on first metadata corresponding to the second process flow that is created by a user. The operations of 1010 may be performed in accordance with examples as disclosed herein. In some examples, aspects of the operations of 1010 may be performed by a decomposition component 630 as described with reference to FIG. 6.

At 1015, the method may include determining a relevance score associated with the first process flow based on the decomposition of the natural language input, where the relevance score indicates how relevant each element of the set of multiple elements is to the task. The operations of 1015 may be performed in accordance with examples as disclosed herein. In some examples, aspects of the operations of 1015 may be performed by a relevance component 655 as described with reference to FIG. 6.

At 1020, the method may include generating, using the large language model, second metadata corresponding to each element of the set of multiple elements of the natural language input based on decomposing the natural language input. The operations of 1020 may be performed in accordance with examples as disclosed herein. In some examples, aspects of the operations of 1020 may be performed by a metadata component 635 as described with reference to FIG. 6.

At 1025, the method may include generating the first process flow based on combining the set of multiple elements in accordance with the second metadata. The operations of 1025 may be performed in accordance with examples as disclosed herein. In some examples, aspects of the operations of 1025 may be performed by a process flow component 640 as described with reference to FIG. 6.

At 1030, the method may include sending, for display to a user interface of a user device, the first process flow including the combined set of multiple elements. The operations of 1030 may be performed in accordance with examples as disclosed herein. In some examples, aspects of the operations of 1030 may be performed by a display component 645 as described with reference to FIG. 6.

A method for data processing by a flow generation service is described. The method may include receiving, via user input, a natural language input that indicates instructions for automating a task in accordance with a first process flow, decomposing, using a configured to support, the natural language input into a set of multiple elements and a set of multiple connectors, where the configured to support is trained on first metadata corresponding to a second process flow that is created by a user, generating, using the configured to support, second metadata corresponding to each element of the set of multiple elements of the natural language input based on decomposing the natural language input, generating the first process flow based on combining the set of multiple elements in accordance with the second metadata, and sending, for display to a user interface of a user device, the first process flow including the combined set of multiple elements.

A flow generation service for data processing is described. The flow generation service may include one or more memories storing processor executable code, and one or more processors coupled with the one or more memories. The one or more processors may individually or collectively operable to execute the code to cause the flow generation service to receive, via user input, a natural language input that indicates instructions for automating a task in accordance with a first process flow, decompose, using a configured to support, the natural language input into a set of multiple elements and a set of multiple connectors, where the configured to support is trained on first metadata corresponding to a second process flow that is created by a user, generate, using the configured to support, second metadata corresponding to each element of the set of multiple elements of the natural language input based on decomposing the natural language input, generate the first process flow based on combining the set of multiple elements in accordance with the second metadata, and send, for display to a user interface of a user device, the first process flow including the combined set of multiple elements.

Another flow generation service for data processing is described. The flow generation service may include means for receiving, via user input, a natural language input that indicates instructions for automating a task in accordance with a first process flow, means for decomposing, using a configured to support, the natural language input into a set of multiple elements and a set of multiple connectors, where the configured to support is trained on first metadata corresponding to a second process flow that is created by a user, means for generating, using the configured to support, second metadata corresponding to each element of the set of multiple elements of the natural language input based on decomposing the natural language input, means for generating the first process flow based on combining the set of multiple elements in accordance with the second metadata, and means for sending, for display to a user interface of a user device, the first process flow including the combined set of multiple elements.

A non-transitory computer-readable medium storing code for data processing is described. The code may include instructions executable by a processor to receive, via user input, a natural language input that indicates instructions for automating a task in accordance with a first process flow, decompose, using a configured to support, the natural language input into a set of multiple elements and a set of multiple connectors, where the configured to support is trained on first metadata corresponding to a second process flow that is created by a user, generate, using the configured to support, second metadata corresponding to each element of the set of multiple elements of the natural language input based on decomposing the natural language input, generate the first process flow based on combining the set of multiple elements in accordance with the second metadata, and send, for display to a user interface of a user device, the first process flow including the combined set of multiple elements.

In some examples of the method, flow generation services, and non-transitory computer-readable medium described herein, decomposing the natural language input may include operations, features, means, or instructions for generating a topology of the natural language input, where the topology includes a graphical representation of the set of multiple elements and the set of multiple connectors.

In some examples of the method, flow generation services, and non-transitory computer-readable medium described herein, decomposing the natural language input may include operations, features, means, or instructions for generating a resource list and a set of properties associated with the natural language input.

In some examples of the method, flow generation services, and non-transitory computer-readable medium described herein, generating the second metadata may include operations, features, means, or instructions for comparing each element of the set of multiple elements of the natural language input to the first metadata corresponding to the second process flow that may be created by the user, where the second metadata may be based on the comparison.

Some examples of the method, flow generation services, and non-transitory computer-readable medium described herein may further include operations, features, means, or instructions for determining a relevance score associated with the first process flow based on the decomposition of the natural language input, where the relevance score indicates how relevant each element of the set of multiple elements may be to the task.

In some examples of the method, flow generation services, and non-transitory computer-readable medium described herein, the first process flow includes one or more custom objects associated with the task.

In some examples of the method, flow generation services, and non-transitory computer-readable medium described herein, the second metadata includes a set of element details corresponding to each element of the set of multiple elements.

In some examples of the method, flow generation services, and non-transitory computer-readable medium described herein, each element of the set of multiple elements includes an action associated with the task and each connector of the set of multiple connectors indicates a relationship between two or more elements of the set of multiple elements.

The following provides an overview of aspects of the present disclosure:

Aspect 1: A method for data processing at a flow generation service, comprising: receiving, via user input, a natural language input that indicates instructions for automating a task in accordance with a first process flow; decomposing, using a configured to support, the natural language input into a plurality of elements and a plurality of connectors, wherein the configured to support is trained on first metadata corresponding to a second process flow that is created by a user; generating, using the configured to support, second metadata corresponding to each element of the plurality of elements of the natural language input based at least in part on decomposing the natural language input; generating the first process flow based at least in part on combining the plurality of elements in accordance with the second metadata; and sending, for display to a user interface of a user device, the first process flow comprising the combined plurality of elements.

Aspect 2: The method of aspect 1, wherein decomposing the natural language input further comprises: generating a topology of the natural language input, wherein the topology comprises a graphical representation of the plurality of elements and the plurality of connectors.

Aspect 3: The method of aspect 2, wherein decomposing the natural language input further comprises: generating a resource list and a set of properties associated with the natural language input.

Aspect 4: The method of any of aspects 1 through 3, wherein generating the second metadata further comprises: comparing each element of the plurality of elements of the natural language input to the first metadata corresponding to the second process flow that is created by the user, wherein the second metadata is based at least in part on the comparison.

Aspect 5: The method of any of aspects 1 through 4, further comprising: determining a relevance score associated with the first process flow based at least in part on the decomposition of the natural language input, wherein the relevance score indicates how relevant each element of the plurality of elements is to the task.

Aspect 6: The method of any of aspects 1 through 5, wherein the first process flow includes one or more custom objects associated with the task.

Aspect 7: The method of any of aspects 1 through 6, wherein the second metadata comprises a set of element details corresponding to each element of the plurality of elements.

Aspect 8: The method of any of aspects 1 through 7, wherein each element of the plurality of elements comprises an action associated with the task and each connector of the plurality of connectors indicates a relationship between two or more elements of the plurality of elements.

Aspect 9: A flow generation service for data processing, comprising one or more memories storing processor-executable code, and one or more processors coupled with the one or more memories and individually or collectively operable to execute the code to cause the flow generation service to perform a method of any of aspects 1 through 8.

Aspect 10: A flow generation service for data processing, comprising at least one means for performing a method of any of aspects 1 through 8.

Aspect 11: A non-transitory computer-readable medium storing code for data processing, the code comprising instructions executable by a processor to perform a method of any of aspects 1 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a flow generation service, comprising:

receiving, via user input, a natural language input that indicates instructions for automating a task in accordance with a first process flow;

decomposing, using a large language model, the natural language input into a plurality of elements and a plurality of connectors, wherein the large language model is trained on first metadata corresponding to a second process flow that is created by a user;

generating, using the large language model, second metadata corresponding to each element of the plurality of elements of the natural language input based at least in part on decomposing the natural language input;

generating the first process flow based at least in part on combining the plurality of elements in accordance with the second metadata; and sending, for display to a user interface of a user device, the first process flow comprising the combined plurality of elements.

2. The method of claim 1, wherein decomposing the natural language input further comprises:

generating a topology of the natural language input, wherein the topology comprises a graphical representation of the plurality of elements and the plurality of connectors.

3. The method of claim 2, wherein decomposing the natural language input further comprises:

generating a resource list and a set of properties associated with the natural language input.

4. The method of claim 1, wherein generating the second metadata further comprises:

comparing each element of the plurality of elements of the natural language input to the first metadata corresponding to the second process flow that is created by the user, wherein the second metadata is based at least in part on the comparison.

5. The method of claim 1, further comprising:

determining a relevance score associated with the first process flow based at least in part on the decomposition of the natural language input, wherein the relevance score indicates how relevant each element of the plurality of elements is to the task.

6. The method of claim 1, wherein the first process flow includes one or more custom objects associated with the task.

7. The method of claim 1, wherein the second metadata comprises a set of element details corresponding to each element of the plurality of elements.

8. The method of claim 1, wherein each element of the plurality of elements comprises an action associated with the task and each connector of the plurality of connectors indicates a relationship between two or more elements of the plurality of elements.

9. A flow generation service for data processing, comprising:

one or more memories storing processor-executable code; and one or more processors coupled with the one or more memories and individually or collectively operable to execute the code to cause the flow generation service to:

receive, via user input, a natural language input that indicates instructions for automating a task in accordance with a first process flow;

decompose, using a large language model, the natural language input into a plurality of elements and a plurality of connectors, wherein the large language model is trained on first metadata corresponding to a second process flow that is created by a user;

generate, using the large language model, second metadata corresponding to each element of the plurality of elements of the natural language input based at least in part on decomposing the natural language input;

generate the first process flow based at least in part on combining the plurality of elements in accordance with the second metadata; and send, for display to a user interface of a user device, the first process flow comprising the combined plurality of elements.

10. The flow generation service of claim 9, wherein, to decompose the natural language input, the one or more processors are individually or collectively further operable to execute the code to cause the flow generation service to:

generate a topology of the natural language input, wherein the topology comprises a graphical representation of the plurality of elements and the plurality of connectors.

11. The flow generation service of claim 10, wherein, to decompose the natural language input, the one or more processors are individually or collectively further operable to execute the code to cause the flow generation service to:

generate a resource list and a set of properties associated with the natural language input.

12. The flow generation service of claim 9, wherein, to generate the second metadata, the one or more processors are individually or collectively further operable to execute the code to cause the flow generation service to:

compare each element of the plurality of elements of the natural language input to the first metadata corresponding to the second process flow that is created by the user, wherein the second metadata is based at least in part on comparing t.

13. The flow generation service of claim 9, wherein the one or more processors are individually or collectively further operable to execute the code to cause the flow generation service to:

determine a relevance score associated with the first process flow based at least in part on the decomposition of the natural language input, wherein the relevance score indicates how relevant each element of the plurality of elements is to the task.

14. The flow generation service of claim 9, wherein the first process flow includes one or more custom objects associated with the task.

15. The flow generation service of claim 9, wherein the second metadata comprises a set of element details corresponding to each element of the plurality of elements.

16. The flow generation service of claim 9, wherein each element of the plurality of elements comprises an action associated with the task and each connector of the plurality of connectors indicates a relationship between two or more elements of the plurality of elements.

17. A flow generation service for data processing, comprising:

a processing system that includes processor circuitry and memory circuitry that stores code, the processing system configured to cause the flow generation service to:

receive, via user input, a natural language input that indicates instructions for automating a task in accordance with a first process flow;

decompose, using a large language model, the natural language input into a plurality of elements and a plurality of connectors, wherein the large language model is trained on first metadata corresponding to a second process flow that is created by a user;

generate, using the large language model, second metadata corresponding to each element of the plurality of elements of the natural language input based at least in part on decomposing the natural language input;

generate the first process flow based at least in part on combining the plurality of elements in accordance with the second metadata; and send, for display to a user interface of a user device, the first process flow comprising the combined plurality of elements.

18. The flow generation service of claim 17, wherein, to decompose the natural language input, the processing system is further configured to cause the flow generation service to:

generate a topology of the natural language input, wherein the topology comprises a graphical representation of the plurality of elements and the plurality of connectors.

19. The flow generation service of claim 18, wherein, to decompose the natural language input, the processing system is further configured to cause the flow generation service to:

generate a resource list and a set of properties associated with the natural language input.

20. The flow generation service of claim 17, wherein, to generate the second metadata, the processing system is further configured to cause the flow generation service to:

compare each element of the plurality of elements of the natural language input to the first metadata corresponding to the second process flow that is created by the user, wherein the second metadata is based at least in part on the comparison.

* * * * *